United States Patent Office 3,409,658
Patented Nov. 5, 1968

3,409,658
PROCESS FOR PREPARING TRINITRATO-
PENTAERYTHRITYL ACRYLATE
William D. Emmons, Huntingdon Valley, Pa., assignor to
Rohm & Haas Company, Philadelphia, Pa., a corporation of Delaware
No Drawing. Continuation-in-part of application Ser. No.
644,955, Mar. 8, 1957. This application Aug. 13, 1958,
Ser. No. 755,846
4 Claims. (Cl. 260—467)

This application is a continuation-in-part of application Ser. No. 644,955, filed Mar. 8, 1957, now abandoned.

This invention deals with a process for preparing trinitratopentaerythrityl acrylate. This process comprises reacting together in the presence of an inert organic polar solvent pentaerythritol trinitrate, acrylic acid, a benzenesulfonyl chloride, and a trialkylamine containing a total of six to fifteen carbon atoms and having alkyl groups of not over five carbon atoms each.

It has previously been proposed to react acryloyl chloride directly with pentaerythritol trinitrate. This reaction gives quite variable results as to smoothness of operation, yield, and quality of product. The reaction products, which are not of good purity, are not readily purified and are of variable stability and utility. The monomers produced by prior art methods do not give satisfactory polymers, these being of low molecular weight, poor stability during compounding, and difficult to use.

I have now discovered that trinitratopentaerythrityl acrylate of high purity can be prepared in very good yields and reproducibility by reacting a benzenesulfonyl chloride, acrylic acid, a tertiary alkylamine having alkyl groups of not over five carbon atoms each, the three alkyl groups containing a total of at least six carbon atoms, and pentaerythritol trinitrate in the presence of an inert organic polar solvent. The reaction can be carried out between $-20°$ and $90°$ C., preferably between $0°$ and $50°$ C. After the above reactants have been brought together and reacted, the resulting reaction mixture is treated with water and/or with dilute aqueous acid (to ensure removal of amine). The desired ester is obtained as a solid. This may be further purified by washing with methanol or, if desired, by recrystallization.

Trinitratopentaerythrityl acrylate is useful as a component of explosive and combustible compositions and for forming polymers, including homopolymers and copolymers useful in the same fields.

The sulfonyl chloride may be benzenesulfonyl chloride itself or a ring-substituted benzenesulfonyl chloride such as p-chlorobenzenesulfonyl chloride, xylenesulfonyl chloride, o- or p-toluenesulfonyl chloride, or a mixture of benzenesulfonyl chlorides. The commercial mixture of the ortho and para toluenesulfonyl chlorides is particularly economical to use. In place of a benzenesulfonyl chloride there can be used the more expensive alkanesulfonyl chlorides, such as methanesulfonyl chloride.

The most economical tertiary amine is triethylamine, but other lower trialkylamines other than trimethylamine can be used, including tripropylamine, tributylamine, butyldimethylamine, triamylamine, amyldiethylamine, or amyldimethylamine.

At least two moles of the amine are needed per mole of the benzenesulfonyl chloride. It is best, however, to use an excess of the amine, a ratio of 2.5 to 3.5 moles of amine per mole of benzenesulfonyl chloride being preferred, and up to a 4:1 mole ratio being permissible.

The acrylic acid and benzenesulfonyl chloride may be used in a proportion chemically equivalent to the pentaerythritol trinitrate up to about a 30% excess thereover of each or both. Excess of these substances ensures complete utilization of the pentaerythritol trinitrate.

As solvent, there is used an inert polar organic solvent which is miscible with water or is readily volatile if not miscible. Suitable solvents include acetonitrile, acetone, methyl ethyl ketone, dioxane, methylene chloride, chloroform, or ethylene chloride. Sufficient solvent is used to maintain the reaction mixture in a stirrable fluid state. Usually one to two volumes of solvent per volume of reaction mixture is used, although a larger volume ratio could be used, such as 4:1, but without advantage.

The solvent may be used to take up acrylic acid and pentaerythritol trinitrate and the teritary amine mixed therewith with evolution of some heat. The order in which these reactants are mixed is of no consequence. The resulting mixture is treated with benzenesulfonyl chloride, best in an inert organic solvent.

The rate of mixing the benzenesulfonyl chloride with the other reaction components should be adjusted to keep the reaction in good control, since there is heat evolved. The rate of addition helps to determine the temperature of the reaction mixture.

Temperature may also be controlled by cooling during the reaction and/or by starting the reaction with one or more reactants at a low temperature. Since reactions have been successfully carried out from below $0°$ up to $90°$ C., it is evident that the temperature of the reaction mixture is not critical.

The reaction is sufficiently fast so that by the time a solution of a benzenesulfonyl chloride is slowly added to a mixture of acrylic acid, tertiary alkylamine, and pentaerythritol trinitrate in solvent, the reaction is complete. In a continuous reactor wherein all components are brought together in flowing streams it has been noted that reaction is complete within a residence time of six minutes or less.

The reaction mixture is treated with water or an aqueous dilute acid solution to remove salts formed from the sulfonyl chloride and the tertiary amine. From about one to four volumes of water or dilute acid solution may be used per volume of reaction mixture. Treatment with water throws down solid trinitratopentaerythrityl acrylate from a mixture containing a water-miscible solvent.

If a polar solvent is used which is not miscible with water, the solution of ester is well washed with water to remove the amine salts.

In either case excess of amine, if used, can be removed by a treatment with water or with an aqueous dilute acid solution, which may be used after the precipitation with water or may be used to precipitate the ester which can then be washed with water.

The product may be used for some purposes at this stage after it has been dried, as by warming below about $50°$ C. and/or by drying under reduced pressure. If further purification is desired, the solid may be washed with methanol. This helps to remove any small amounts of color which may be present. The ester is then dried, as above. Again, if desired the product may be crystallized from an organic solvent by conventional steps.

The process of this invention is illustrated by the following examples. Parts are by weight unless otherwise designated.

Example 1

To 320 parts of a mixture containing 85% of pentaerythritol trinitrate in acetonitrile there is added 60 parts of acetonitrile. This solution is stirred and cooled with an external bath of ice and salt to about $0°$ C. Thereto is added 93.5 parts of acrylic acid and then is slowly added 350 parts of triethylamine, the temperature being maintained below $20°$ C. This reaction is exothermic during about the first third of the addition of the amine. The mixture is then kept between 10° and 20° and is slowly treated with a solution of 212 parts of benzenesulfonyl chloride in 200 parts of acetonitrile. This addition takes 40 minutes. The resulting mixture is stirred at about 20° C. for a half hour and poured into 2058 parts of aqueous 4% sulfuric acid solution. A white solid precipitates. It is washed with water and then with about 400 parts of cold methanol. It is dried under reduced pressure to give 283 parts of a nearly colorless product, a yield of 87% of trinitratopentaerythrityl acrylate, which by analysis has a purity of over 97%. It melts at 78° C. It forms a solid polymer. When treated with azobisisobutyronitrile and heated to 80° C., it forms a hard, solid polymer.

Repetition of the above procedure with substitution of triamylamine for the above triethylamine leads to the same product in similar yields and purity.

Example 2

To 320 parts of a mixture containing 85% of pentaerythritol trinitrate and 15% of acetonitrile there is added 65 parts of acetonitrile. This solution is cooled to about 10° C. and mixed with 94 parts of acrylic acid. There is slowly added 350 parts of triethylamine with the temperature kept below 20° C. This mixture is stirred and to it is slowly added a solution of 228 parts of a commercial toluenesulfonyl chloride, consisting of 80% of the ortho isomer and 20% of the para isomer, in 225 parts of acetonitrile. The temperature rises to about 40° C. The reaction mixture is stirred for a half hour and is poured into about 2500 parts of water. A white solid forms and is separated. It is slurried with water and the slurry is centrifuged. The solid is again washed with water, separated, and dried. Trinitratopentaerythrityl acrylate is obtained in a yield over 90% and in a purity of over 97%. The product melts at 78° C. and polymerizes normally for this ester.

Example 3

There are mixed 160 parts of a mixture of 85% pentaerythritol trinitrate in acetonitrile, 100 parts of acetone, and 40 parts of acrylic acid. This mixture is cooled below 10° C. and thereto is slowly added with good stirring 170 parts of triethylamine, while the temperature is kept below 25° C. To this mixture is slowly added a solution of 110 parts of the commercial mixture of ortho- and para-toluene-sulfonyl chloride in about 120 parts of acetone. The reaction mixture is then poured into 2000 parts of cold water. A whitish solid precipitates. It is separated, washed with 500 parts of an aqueous 2% sulfuric acid solution and again with water. It is then rinsed with cold methanol and dried under reduced pressure. The yield is 70% of trinitratopentaerythrityl acrylate of avore 90% purity.

Repetion of the above procedure with dioxane used as a solvent produces a similar product in a similar yield.

Replacement of triethylamine in the above procedure with tributylamine or butyldimethylamine likewise permits obtaining the desired trinitratopentaerythrityl acrylate in good yield and high purity. With these amines it is necessary to precipitate product or to wash the product with a dilute strong acid such as sulfuric, hydrochloric, or phosphoric to insure removal of any free amine.

Example 4

There are mixed 320 parts of an 85% mixture of pentaerythritol trinitrate in acetonitrile and 200 parts of chloroform. The mixture is cooled to 20° C. and mixed with 94 parts of acrylic acid and then 350 parts of triethylamine is added with the temperature kept below 30° C. The mixture is stirred and thereto is slowly added 212 parts of benzenesulfonyl chloride in 300 parts of chloroform. The temperature is maintained between 30° and 40° C. by external cooling. The reaction mixture is stirred for a half hour and poured into 3000 parts of water. The organic layer is separated, is washed with aqueous 5% sulfuric acid solution and is washed with water. The organic layer is dried over magnesium sulfate. The chloroform is evaporated at reduced pressure with a temperature of 40° C. at 25 mm. for an hour. The residue is trinitratopentaerythrityl acrylate in a purity of over 95% and a yield of 85%. It polymerizes normally.

The trinitratopentaerythrityl acrylate prepared as above is advantageous as compared to the ester made by previous methods in stability, purity, and utility. For example, preparations of ester based on a method involving thionyl chloride were variable in stability. Some of these previous preparations self-ignited when stored at room temperatures while others were thermally unstable. These difficulties are avoided in the ester as prepared by the method of this invention.

Under the conditions used in this method the disproportionation of pentaerythritol trinitrate, such as readily occurs in an acid environment, does not take place. Hence, there is avoided the formation of dinitratopentaerythrityl diacrylate, which is a material causing cross-linking and insobubility of polymer. Cross-linking seriously interferes with the practical utility of trinitratopentaethrythrityl acrylate. Since polymer from the ester prepared according to the method of this invention remains thermoplastic and can be dissolved, plasticized, and shaped, it is useful not only for purposes in which the previously known ester and its polymer found application but also for new uses. It may be used for plastic bonding of explosives. It may enter into a variety of explosive and combustible compositions.

For instance, with observance of proper percautions for handling and formulating potentially explosive compositions there are mixed 35 parts of trinitratopentaerythrityl acrylate, 65 parts of pentaerythritol tetranitrate, and 0.007 part of a polymerization inhibitor, such as p-methoxyphenol or N-nitrosodiphenylamine. The heated mixture is evacuated to remove entrapped air and cast into war head casings. The loaded casings are cured at 80° C. for 48 hours. Such casings may be used in rockets.

The ester may be used to form castings of polymer in desired shapes. For example, there are mixed 100 parts of monomeric ester and 0.02 part of inhibitor. The mixture is heated to 80° C. under reduced pressure. The resulting liquid is run into molds which are in the shape of shell casings and which are coated with polytetrafluoroethylene. The filled molds are heated at about 80° C. for 48 hours to form polymer in the shape of the casings. These are loaded with a conventional nitrocellulose gun propellant and equipped with an igniter, squib, and projectile. There is thus provided a combustible casing which adds to muzzle velocity and avoids need of a cartridge ejection device.

The monomeric ester and/or polymers or copolymers therefrom may be mixed with conventional oxidizers, such as nitrates, to provide combustible and explosive mixtures. Thus, there may be mixed 5 to 50 parts of the monomer and/or polymer with 95 to 50 parts of ammonium or potassium nitrate to provide such mixtures. Other nitrate compounds may also be used in such mixtures and conventional agents which are used in such mixtures may also be incorporated.

I claim:

1. A process for preparing trinitratopentaerythrityl acrylate with comprises reacting together below 90° C. pentaerythritol trinitrate, acrylic acid, a benzenesulfonyl chloride from the class consisting of benzenesulfonyl chloride, toluenesulfonyl chloride, xylenesulfonyl chloride, chlorobenzenesulfonyl chloride, and mixtures thereof; and a trialkylamine in which the alkyl groups contain not over five carbon atoms each and together have a total of six to fifteen carbon atoms in an inert polar organic solvent from the class consisting of acetonitrile, acetone, methyl ethyl ketone, dioxane, methylene chloride, chloroform, and ethylene chloride and treating the resulting reaction mixture with water.

2. A process for preparing trinitratopentaerythrityl acrylate which comprises reacting together between 0° and 50° C. pentaerythritol trinitrate, acrylic acid, a benzenesulfonyl chloride from the class consisting of benzenesulfonyl chloride, toluenesulfonyl chloride, xylenesulfonyl chloride, chlorobenzenesulfonyl chloride, and mixtures thereof; and triethylamine in an inert, polar organic solvent from the class consisting of acetonitrile, acetone, methyl ethyl ketone, dioxane, methylene chloride, chloroform, and ethylene chloride, treating the resulting reaction mixture with water, and separating trinitratopentaerythrityl acrylate.

3. The process of claim 2 wherein the solvent is water-miscible.

4. A process for preparing trinitratopentaerythrityl acrylate which comprises reacting together between 0° and 50° C. pentaerythritol trinitrate, acrylic acid, toluenesulfonyl chloride, and triethylamine in acetonitrile as a solvent, treating the resulting reaction mixture with water, and separating trinitratopentaerythrityl acrylate.

References Cited
UNITED STATES PATENTS

| | | | |
|---|---|---|---|
| 2,860,156 | 11/1958 | Cannon | 260—467 |
| 3,238,245 | 3/1966 | Reedy | 260—467 |

LELAND A. SEBASTIAN, *Primary Examiner.*